United States Patent
Zhang et al.

(10) Patent No.: US 6,785,855 B2
(45) Date of Patent: Aug. 31, 2004

(54) IMPLEMENTATION OF AN ASSERTION CHECK IN ATPG MODELS

(75) Inventors: Aiteen Zhang, Westford, MA (US); Joseph Siegel, Shrewsbury, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 478 days.

(21) Appl. No.: 10/010,797

(22) Filed: Nov. 13, 2001

(65) Prior Publication Data

US 2003/0093734 A1 May 15, 2003

(51) Int. Cl.⁷ .............................................. G01R 31/28
(52) U.S. Cl. ..................................... 714/731; 714/744
(58) Field of Search ................................ 714/724, 726, 714/729, 731, 744, 798, 814; 377/64, 73, 78, 77; 713/500

(56) References Cited

U.S. PATENT DOCUMENTS

| | | | |
|---|---|---|---|
| 3,783,254 A | | 1/1974 | Eichelberger ............... 235/152 |
| 4,293,919 A | | 10/1981 | Dasgupta et al. ........... 364/716 |
| 4,855,669 A | * | 8/1989 | Mahoney ..................... 324/73.1 |
| 5,463,338 A | | 10/1995 | Yurash ........................ 327/202 |
| 5,479,414 A | | 12/1995 | Keller et al. ............... 371/22.3 |
| 5,633,812 A | | 5/1997 | Allen et al. ................. 364/578 |
| 6,219,811 B1 | | 4/2001 | Gruetzner et al. .......... 714/726 |
| 6,393,592 B1 | * | 5/2002 | Peeters et al. .............. 714/731 |

* cited by examiner

Primary Examiner—Christine T. Tu
(74) Attorney, Agent, or Firm—Lahive & Cockfield, LLP

(57) ABSTRACT

A system and method for implementing an assertion check in an ATPG scan cell is provided. The assertion check includes an error signal generator within a scan cell that generates an error signal when there is a violation of necessary conditions for testing the integrated circuit using APTG. According to the illustrative embodiment, the scan cell comprises a set-reset flip-flop paired with a latch. The flip-flop is used as a master storage element and the latch is used as a slave storage element to form a scan path. The master flip-flop and the slave latch are connected to form a shift register for shifting test data through the circuit under test. A system clock drives the standard operational mode of the storage elements and a shift clock drives the test mode. An enable clock is used to activate the system clock and switch the scan cell between the standard operational mode and the test mode. The assertion check ensures that the enable clock and the shift clock are not both high at the same time by generating an error signal at the output of the flip-flop when both clocks are simultaneously high. The assertion check is implemented by adding a logic gate or a set of logic gates to the scan cell and connecting the output of the logic gate to the set and reset pins of the flip-flop, such that the flip-flop generates an error signal when both clocks are high.

20 Claims, 6 Drawing Sheets

Latch Truth Table

| Di | CLKi | RESET | SET | Q | QN |
|---|---|---|---|---|---|
| 0 | 1 | 0 | 0 | 0 | 1 |
| 1 | 1 | 0 | 0 | 1 | 0 |
| ? | 0 | 0 | 0 | Q | QN |
| 1 | 1 | 1 | 0 | X | X |
| ? | 0 | 1 | 0 | 0 | 1 |
| 0 | 1 | 1 | 0 | 0 | 1 |
| 0 | 1 | 0 | 1 | X | X |
| 1 | 1 | 0 | 1 | 1 | 0 |
| ? | 0 | 0 | 1 | 1 | 0 |
| ? | ? | 1 | 1 | X | X |

*Fig. 4*

D Flip-Flop Truth Table

| Di | CLK1 | SET | RESET | Q | QN |
|---|---|---|---|---|---|
| 0 | ^ | 0 | 0 | 0 | 1 |
| 1 | ^ | 0 | 0 | 1 | 0 |
| ? | - | 0 | 0 | Q | QN |
| 0 | ^ | 0 | 1 | 0 | 1 |
| 1 | ^ | 0 | 1 | X | X |
| ? | - | 0 | 1 | 0 | 1 |
| ? | ? | 0 | 1 | 0 | 1 |
| 0 | ^ | 1 | 0 | X | X |
| 1 | ^ | 1 | 0 | 1 | 0 |
| ? | - | 1 | 0 | 1 | 0 |
| ? | ? | 1 | 0 | 1 | 0 |
| ? | ? | 1 | 1 | X | X |

*Fig. 6*

IMPLEMENTATION OF AN ASSERTION CHECK IN ATPG MODELS

FIELD OF THE INVENTION

The present invention relates to testing integrated circuit designs using automatic test pattern generation (ATPG). More particularly, the present invention relates to implementation of an assertion check in a scan cell used in ATPG to ensure that necessary conditions for performing an ATPG procedure are satisfied.

BACKGROUND OF THE INVENTION

An important step in the development and design of an integrated circuit is testing to detect faults in the circuit design. Testing of an integrated circuit generally involves adding partial or full scan to a circuit design using an ATPG program. The ATPG program generates a set of test patterns to identify faults in the integrated circuit design, which are applied to the input pins of the integrated circuit under test. The response of the integrated circuit to the test patterns is examined at the output pins of the integrated circuit to detect logic faults in the circuit design. A test pattern generally comprises a sequence of bits in the form of a vector, which is sequentially shifted through the storage elements of the integrated circuit.

FIG. 1 is a flow chart diagramming the steps involved in ATPG for testing an integrated circuit using an ATPG tool, such as FastScan or TetraMAX. A standard ATPG program generally initializes in step 10 by invoking a set of input information describing the integrated circuit under test. Typically, the input information comprises a netlist, such as a Verilog netlist, defining the circuit design and an ATPG library defining primitives and arrays for the circuit design. Verilog is a Hardware Description Language (HDL) for electronic design and gate level simulation and the netlist comprises a test file description of a physical connection of components in the circuit design. The ATPG program then switches to a setup mode and invokes a setup file containing list of commands in step 11. Next, in step 12, the ATPG program performs a scan extraction. Scan extraction involves reading the description of the circuit under test and calculating testability measurements for the circuit using design rules checking (DRC). The ATPG program identifies and debugs any design errors in the circuit in step 13.

The ATPG program then proceeds to fault simulation and test pattern generation. Test pattern generation may be random, sequential, or fast sequence test pattern generation. Fault simulation is used to simulate the circuit design on a computer to facilitate the identification of defects in the actual circuit. During fault simulation, possible defects are inserted into the simulated circuit design to simulate and anticipate the response of the circuit to these defects. In step 14, the ATPG program compiles a list of potential faults for the circuit and generates test patterns that simulate each fault in the list in step 15. The test generation algorithm creates test patterns that simulate each of the potential fault types for the circuit under test. In step 16, the test patterns are saved in various pattern formats. Generally, the test patterns are saved in Verilog, VHDL, EDIF or any suitable format. In step 17, a fault coverage report is generated, which describes the percentage of potential faults from the fault list that are successfully simulated.

In step 18, the test patterns are applied to a circuit under test and the output response is analyzed to identify faults in the circuit design. The circuit under test is switched to a test mode and the patterns generated by the ATPG tool are shifted through a scan portion of the circuit and output to an output pin. The scan portion comprises a set of storage elements, which form a shift register in test mode. During playback, the output test patterns shifted output the circuit and the vectors generated during fault simulation are compared by an output analyzer. The output analyzer compares the expected response of the circuit to the actual response of the circuit to diagnose and isolate faults that cause failures in the circuit. In step 19, the results are printed to a file and a report identifying the faults detected in the circuit is generated.

"Scan design" refers to an electronic circuit design technique that facilitates testing of the circuit by making the storage elements of the circuit, which temporarily store logical states within the integrated circuit, scannable. Scan design involves incorporating scan registers into the circuit to form a scan path, thereby increasing the controllability and observability of the circuit. As discussed, the integrated circuit is tested by shifting a test vector generated by an ATPG program through the storage elements to ensure that the integrated circuit is functioning properly. Using scan design, the state of certain points in the circuit may be modified at any time by suspending normal operation and switching to a "test" mode. In standard operation, the shift registers perform normal operational tasks. The storage elements in the shift registers can be switched into a "test" mode and form a scan portion of the integrated circuit. During test mode, test pattern data can be clocked serially through all the scan registers and out of an output pin at the same time as new test pattern data is clocked in from an input pin.

Level Sensitive Scan Design (LSSD), developed by IBM, is a common type of scan design used with ATPG to test a circuit. LSSD uses separate system and scan clocks to distinguish between a standard operating mode and a test mode. In LSSD, level-sensitive latches used on-chip for state information are replaced by master-slave latch pairs, which are tied together into one long shift register. In standard operating mode, each storage-element is a level sensitive latch controlled by a system clock. For test operation, the latches form master/slave pairs, each pair having one scan input, one scan output and two non-overlapping scan clocks, which are held low during system operation but cause the scan data to be latched when pulsed high during scan. New state information is shifted in serially, allowing the core circuitry in the circuit to process this information, and shift out the modified state information to an output pin.

Current ATPG tools, such as those in the "FastScan" suite developed by Mentor Graphics and the "TetraMAX" suite developed by Synopsys, are used to analyze and classify probable defect sights using a simulation-based approach and a dynamic algorithm. However, many of the currently available ATPG tools used with LSSD cause significant fault coverage loss and test coverage loss and have a negative impact on the performance of the circuit. In other words, many potential design defects cannot be simulated and tested using these tools and of the design defects that can be simulated and tested for, many often go undetected.

In addition, prior scan cells used in ATPG lack a system for ensuring that necessary conditions are satisfied during testing. For example, in a circuit incorporating scan design, the scan cell can switch between a standard operating mode and a test mode, but cannot operate in both modes simultaneously. A system clock controls the input of data into the circuit during the standard operating mode and a scan clock controls the shifting of test pattern data through the scan portion of the circuit during test mode. The system clock and the scan clock must be independent and non-overlapping to differentiate between the standard operating mode and the test mode. Simultaneous activation of the system clock and the scan clock interferes with the shifting of test data through the circuit under test and results in significant inaccuracies and discrepancies Thus, it would be desirable to implement an assertion check to ensure that simultaneous activation of a system clock and a scan clock in a scan cell does not occur.

SUMMARY OF THE INVENTION

The illustrative embodiment of the present invention provides an assertion check in a design-for-test scan cell to ensure that necessary conditions for certain signals are satisfied. The assertion check includes an error signal generator within the scan cell that generates an error signal when there is a violation of necessary conditions for testing the integrated circuit using APTG. According to the illustrative embodiment, the scan cell comprises a set-reset flip-flop paired with a latch. The flip-flop is used as a master storage element and the latch is used as a slave storage element to form a scan path. The master flip-flop and the slave latch are connected to form a shift register for shifting test data through the circuit under test. According to the illustrative embodiment, a system clock drives the standard operational mode of the storage elements and a shift clock drives the test mode. An enable clock is used to activate the system clock and switch the scan cell between the standard operational mode and the test mode. The assertion check according to the illustrative embodiment ensures that the enable clock and the shift clock are not both high at the same time, which would be a violation of conditions necessary for performing ATPG testing.

According to the illustrative embodiment, the enable clock signal and the shift clock signal are input to a logic gate, such as an AND gate, or a set of logic gates having an output signal that indicates whether both input signals are high. The output of the logic gate or set of logic gates is connected to a set pin and a reset pin of the master flip-flop. If both the enable clock signal and the shift clock signal are high at the same time, the flip-flop generates an error signal.

The illustrative embodiment of the invention ensures that the necessary conditions for performing ATPG testing are satisfied. The assertion check is relatively simple to implement without affecting the performance of the circuit. Moreover, the assertion check provides a reliable means of detecting inconsistencies during testing of a circuit design.

According to one embodiment a method of performing an assertion check in a scan cell is provided. The scan cell comprises a scanning clock corresponding to a test mode, a system clock corresponding to an operating mode and an enable clock for activating the system clock. The method comprises comparing the scanning clock and the enable clock and generating an error signal if both the scanning clock and the enable clock are high simultaneously.

According to another embodiment, a method of implementing an assertion check in a scan cell is provided. The scan cell comprises a flip-flop connected to a latch, a system clock signal, a scan clock signal and an enable clock signal for activating the system clock signal. The method comprises providing a logic gate having inputs and an output and connecting the enable clock signal and the scan clock signal to the inputs of the logic gate.

According to yet another embodiment, an integrated circuit having scan capabilities is provided. The integrated circuit comprises a master storage element comprising a set-reset flip-flop a slave storage element comprising a latch, a system clock input to the flip-flop for controlling the flip-flop during an operating mode, a scanning clock signal input to the flip-flop for controlling the flip-flop during a test mode, an enable clock signal input for activating the system clock signal and a logic gate for generating an indicator signal indicative of simultaneous activation of the scanning clock signal and the enable clock signal. The master storage element and the slave storage element form a shift register for shifting test data through the integrated circuit to detect faults during the test mode.

BRIEF DESCRIPTION OF THE DRAWINGS

FIG. 4 is a truth table for a latch used in the LSSD scan cell of FIG. 3.

FIG. 6 is a truth table for a D flip-flop used in the scan cell illustrated in FIG. 5.

DETAILED DESCRIPTION

The illustrative embodiment provides an improved testing design for ATPG for detecting faults in an integrated circuit. The illustrative embodiment enables automatic testing of integrated circuit designs and provides an assertion check to ensure that the necessary conditions for performing the test are satisfied without compromising performance. The illustrative embodiment is implemented in the design and testing of UltraSparc processors, developed by Sun Microsystems. One skilled in the art will recognize that the invention is not limited to UltraSparc processors and may be utilized to design and test any suitable integrated circuit.

Figure 1:
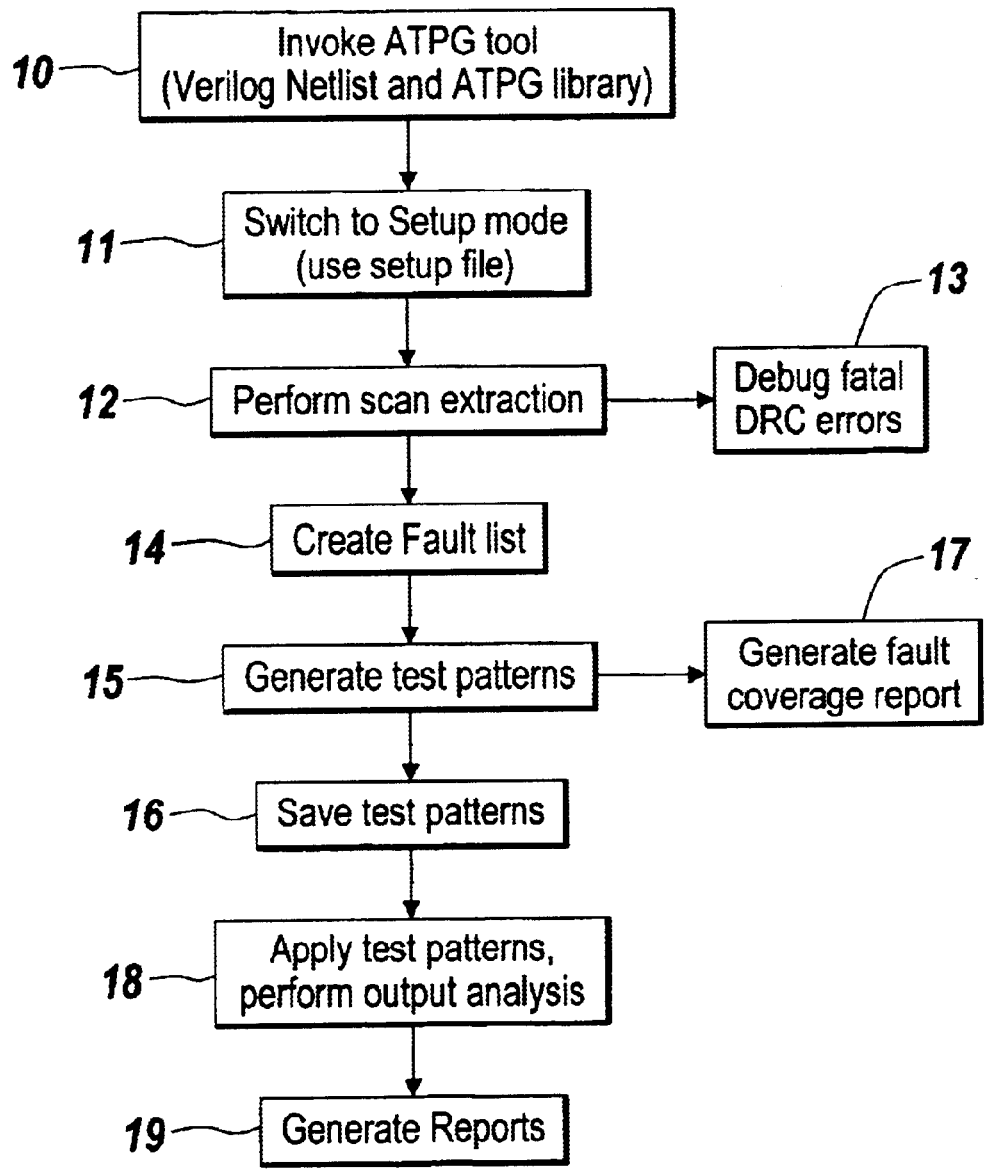
FIG. 1 illustrates the steps involved in performing conventional ATPG for testing an integrated circuit.

The scan cell of the illustrative embodiment of the present invention scans test patterns generated via ATPG to test a circuit design. Test data generated by the ATPG process illustrated in FIG. 1 is shifted through the scan cell of the illustrative embodiment during test mode to detect faults in the circuit design. One skilled in the art will recognize that the present invention is not limited to these ATPG tools, and that any suitable ATPG tool for generating test vectors for testing an integrated circuit design may be utilized. ATPG tools analyze and classify probable defect sites in a circuit using a simulation-based approach and a dynamic algorithm. As discussed, test patterns generated via ATPG are applied to the circuit under test and the output response is analyzed to identify faults in the circuit design. The circuit under test is switched to a test mode, and the test patterns generated by the ATPG tool are shifted through a scan portion of the circuit and output to an output pin. The scan portion generally comprises a set of storage elements, which form a shift register in test mode.

Figure 2A:
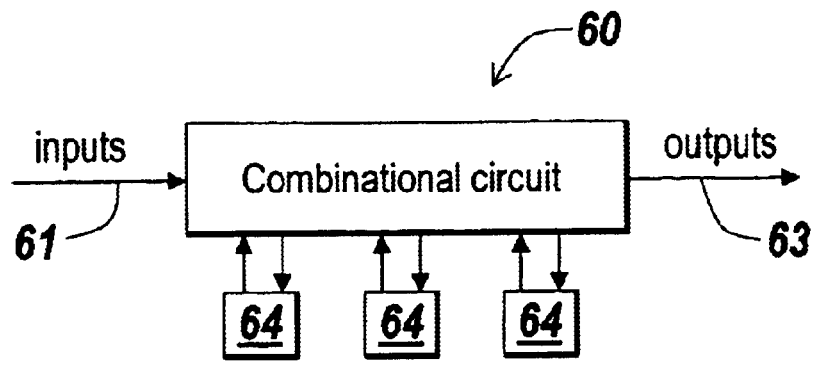
FIG. 2a is a block diagram of an integrated circuit during standard operating mode.
Figure 2B:
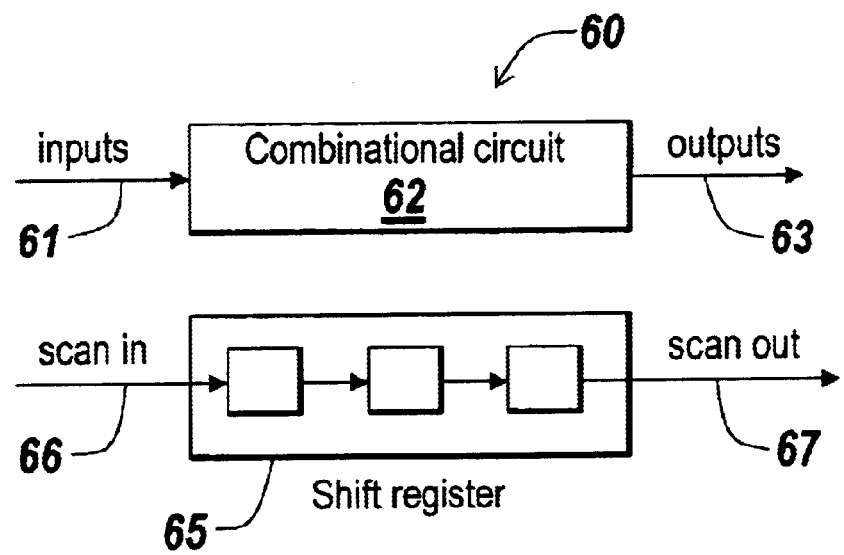
FIG. 2b is a block diagram of an integrated circuit during test mode.

FIGS. 2a and 2b illustrate a circuit incorporating scan design to allow testing of the circuit using ATPG. FIG. 2a is a diagram of an integrated circuit 60 during standard operating mode. In FIG. 2a, the integrated circuit comprises a set of primary inputs 61 connected to combinational logic 62 and a set of primary outputs 63 connected to the combinational logic 62. As shown, storage elements 64 are also connected to the combinational logic and store data from the combinational logic 62. FIG. 2b illustrates the integrated circuit 60 of FIG. 2a during test mode, wherein the memory elements 64 are made scannable. During test mode, the normal data flow between the storage elements 64 and the combinational logic 62 is disabled and the storage elements 64 form scan cell 65, comprising a shift register for shifting test data generated by ATPG through the circuit. Test data is shifted in at a scan input 66 and shifted out for observation and measurement at a scan output 67.

Figure 3:
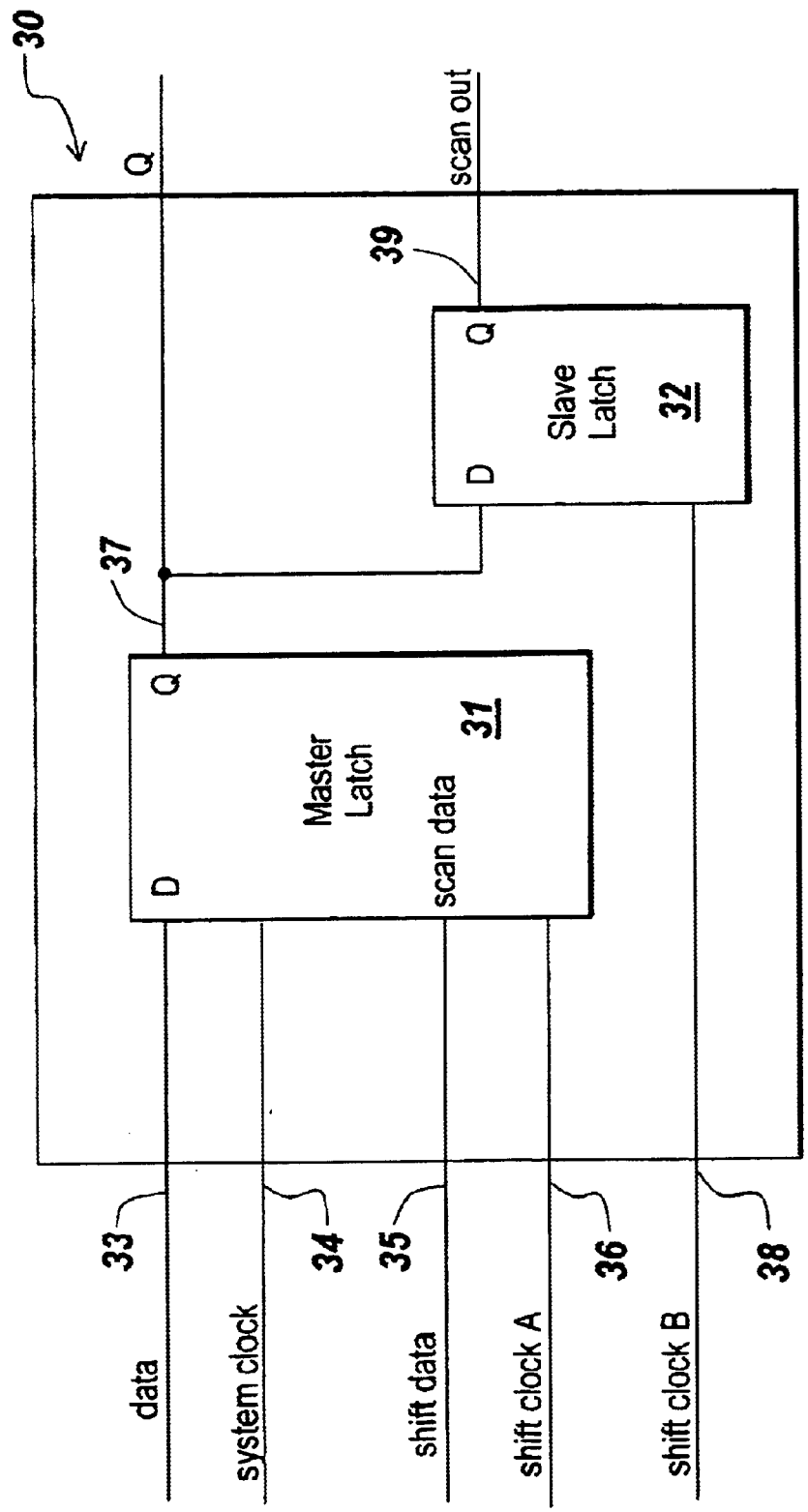
FIG. 3 illustrates a traditional LSSD scan cell of the prior art.

FIG. 3 is a diagram of a conventional LSSD scan cell 30 forming the scan portion of a circuit during testing of the circuit. The scan cell includes a master latch 31 and a slave latch 32. A latch generally comprises a level-sensitive digital logic circuit used to store one or more bits. A latch has a data input, a clock input and an output. When the clock input is active, data on the input is "latched" or stored and transferred to the output either immediately or when the clock input goes inactive. The output of the latch retains its value until the clock goes active again. A truth table for a latch is illustrated in FIG. 4. As shown, the output Q of a latch depends on the value of the data input and the clock input. In the illustrated design, the set and reset inputs are kept low.

In a standard operating mode, the latches 31, 32 operate as normal storage elements. The inputs to the master latch 31 for the standard operating mode are a data line 33 and a system clock 34. During standard operating mode, data from the combinational logic of the circuit is shifted through data line 33 and stored in the latches 31, 32 under the control of the system clock 34. In a test mode, the latches 31, 32 are tied together into a master-slave pair and operate as one long shift register. The inputs comprising the shift portion of the scan cell 30 are a scan data line 35 for shifting test data generated by ATPG into the master latch 31 and an "A" clock 36 for controlling the shifting of test data into the scan cell master latch. When the "A" clock is pulsed high, test data is latched in the master clock. The master latch produces a Q output 37 depending on the active clock and data inputs. In test mode, the master latch Q output 37 is transferred to the input of the slave latch 32. A "B" clock 38 controls the shifting of data through the slave latch 32. When the "B" clock 38 is pulsed high, the output 37 of the master latch is latched. The scan data output is developed at the Q output 39 of the slave latch, where it is examined to detect faults, according to ATPG protocol. The test mode for testing the circuit is activated by de-activating the system clock 34, which isolates all of the latch circuits from one another and permits the scan-in/scan-out operations to be performed. The A and B clocks 36, 38 are held low during normal system operation, and are activated to switch the scan cell to test mode, causing scan data generated by ATPG to be latched when the A and B clocks 36, 38 are pulsed high.

Figure 5:
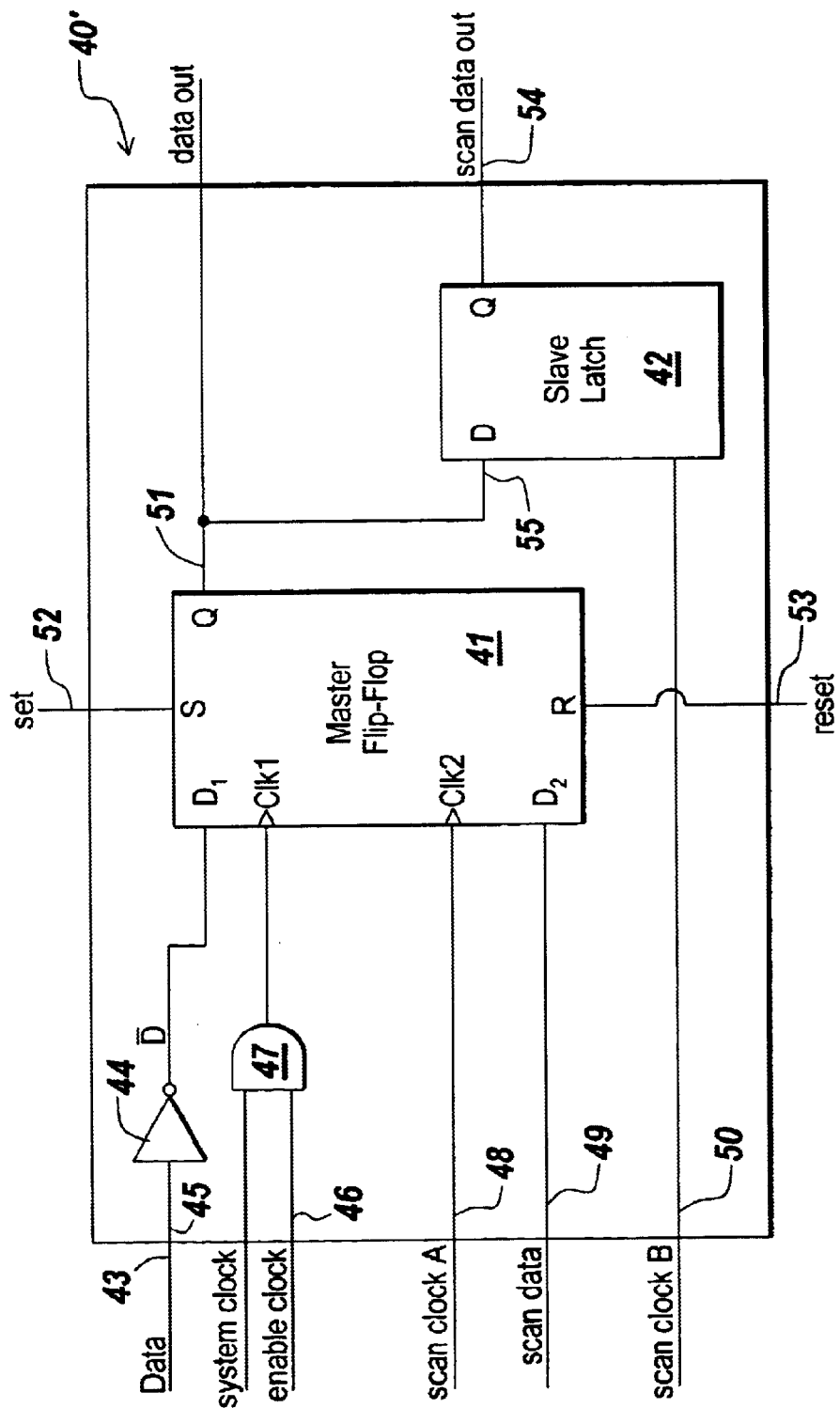
FIG. 5 illustrates a scan cell suitable for implementing the illustrative embodiment of the invention.

A scan cell suitable for implementing the illustrative embodiment of the invention is illustrated in FIG. 5. As shown, the scan cell 40 comprises a D flip-flop 41 paired with a standard latch 42. In the illustrative embodiment, the flip-flop 41 comprises a master storage element and the latch 42 comprises a slave storage element for shifting test patterns through the circuit. According to the illustrative embodiment, the master flip-flop 41 comprises a "set/reset" flip-flop, wherein a set line 52 and a reset line 53 are used to set the state of the flip-flop 41. A normal data line 43 is provided for passing data from the combinational logic of the circuit to the flip-flop 41 to store the data during standard operation. The normal data line 43 for the master flip-flop 41 passes through a NOT logic gate 44 to invert the data signal. The inverted data signal is then passed to the normal data input of the flip-flop. A system clock 45 corresponds to the normal operation mode and is used to control the storage of data from the combinational logic of the circuit during standard operation. An "enable" clock 46 is used to activate and de-activate the system clock to allow the scan cell 40 to switch between a normal operation mode and a test mode. The system clock 45 and the enable clock 46 pass through an AND logic gate 47. When the enable clock signal is high, the system clock is activated. When the enable clock signal is low, the system clock is deactivated, and the output from the AND logic gate 47 is low, independent of the value of the system clock 45. A first scan clock 48 and a scan data line 49 are inputs to the master flip-flop 41. Test patterns generated by ATPG are shifted into the scan cell 40 through the scan data line 49 during test mode under the control of the first scan clock 48. Test data is first shifted through the master flip-flop 41 to the Q output 51. The test data is then shifted from the Q output 51 to the input 55 of the slave storage element, latch 42. The latch 42 has a second scan clock 50 for controlling the shifting of data from the Q output 51 of the flip-flop into the latch 42. The scan output 54 of the latch 42 forms the scan-out data, which, during test mode, is measured and examined to diagnose faults in the circuit and determine if the circuit is functioning properly, as discussed above.

A truth table for the D flip-flop 41 used in the master storage element of the scan cell 40 is shown in FIG. 6. As discussed, the set line 52 and the reset line 53 are used to set the state of the flip-flop 41. In the illustrative embodiment, the set line 52 and the reset line 53 are normally held low, unless a necessary condition for performing a test of the circuit is violated. This feature will be discussed in detail below. When the set and reset are held low, the output of the flip-flop 41 is controlled by the edge of the active clock. As shown, when the active clock is rising, indicated by a "^" character, the active input D1 of the flip-flop is transferred immediately to the output Q. When the active clock is falling, indicated by a "–" character, the Q output of the flip-flop maintains its previous value, independent of the value of the D1 input.

Figure 7:
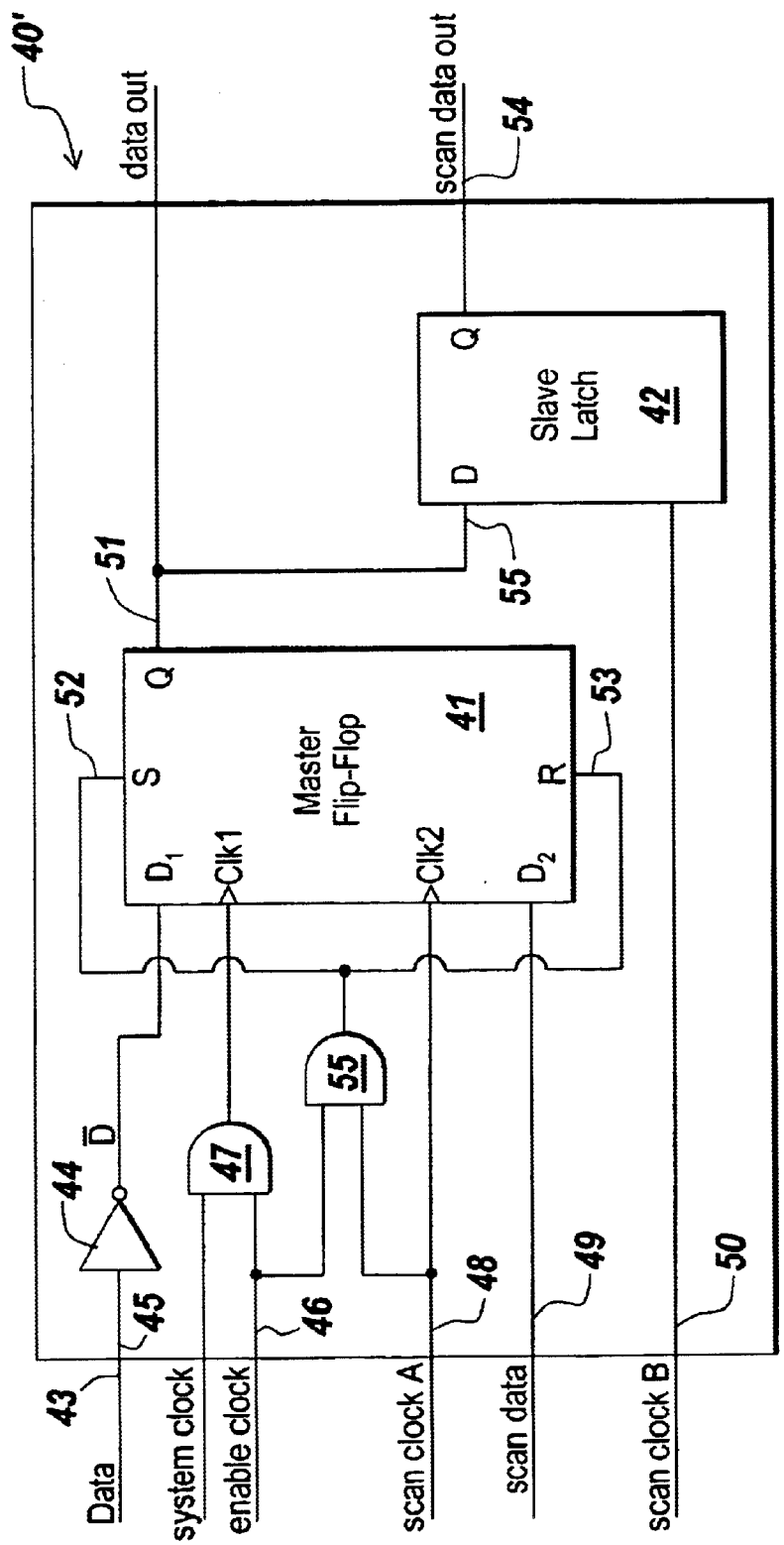
FIG. 7 illustrates a scan cell incorporating an assertion check according to the illustrative embodiment.

FIG. 7 illustrates the scan cell of FIG. 5 including an assertion check according to the illustrative embodiment of the invention. The scan cell 40' includes the same components and features as the scan cell 40 of FIG. 5 and further includes circuitry for implementing an assertion check. In the illustrated scan cell design, the scan clocks 48, 50 and the system clock 45 must be independent and non-overlapping to differentiate between the normal operational mode and the test mode. Simultaneous activation of the enable clock 46 and the first scan clock 48 interferes with the shifting of test data through the circuit under test and results in inaccuracies and discrepancies. At start of each test cycle for shifting test data through the circuit, the system clock 45 input must be inactive by keeping the enable clock 46 low. The first scan clock 46 is pulsed high to shift test data into the circuit and through the scan path. The illustrative embodiment of the present invention ensures the enable clock 46 and the scan clock 48 do not overlap and are not simultaneously active in order to achieve accurate testing of the circuit or accurate data processing and storage.

The illustrative embodiment provides a simple means of detecting an inconsistency and generating an error signal at output of the flop without affecting the performance of the scan cell. The scan cell 40' of the illustrative embodiment compares the enable clock 46 and the first scan clock 48, detects when both the enable clock 46 and the first scan clock 48 are both high at the same time and generates an error signal if and when this condition occurs. According to the illustrative embodiment, an AND gate 55 is used to couple the relevant clock signals 46, 48 together. If both clock signals are high at the same time, the output of the AND gate 55 is also high. Otherwise, if only one of the enable signal 46 and the scan clock signal 48 is active or neither of the relevant signals are active, the output of the AND gate 55 is low. The output of AND gate 55 is connected directly to the set input 52 and the reset input 53 of the flip-flop 41. As shown in the truth table of FIG. 6, if both the set input 52 and the reset input 53 of a set-reset flip-flop are active (i.e., both set and reset are 1), the output of the flip-flop is inherently indeterminate, regardless of the clock input and the data input. According to the illustrative embodiment, the flip-flop generates an "X" or other suitable error signal at the output 51 when both the set and the reset inputs are active to indicate that an unsatisfactory condition has occurred (i.e. both the enable clock 46 and the first scan clock 48 are active). If only one of the relevant clock signals 46, 48 is active, or if neither is active, the output of the AND gate 55 is zero, resulting in the set and reset inputs of the flip-flop being zero. When this occurs, no error signal is generated, indicating that the necessary condition (i.e. the independence and mutual exclusion of the enable clock 46 and the scan clock A 48) has been satisfied.

One of ordinary skill in the art will recognize that the present invention is not limited to an AND gate and that any suitable logic gate or combination of logic gates whose output is tied to the set input and the reset input of a set-reset flip-flop in a scan cell may be utilized. For example, according to an alternate embodiment of the invention, the enable clock signal 46 and the scan clock A signal 48 may both be inverted through NOT logic gates. The inverted signals may then be passed through a NOR gate, which will generate a high signal if both inputs are low, i.e. both the enable clock 46 and the scan clock A 48 are high at the same time. The output of the NOR gate may then be passed to the set and reset inputs of the flip-flop, which generates an error signal when both the enable signal 46 and the scan clock A signal 48 are active. Alternatively, the inverted signals of the enable signal 46 and the scan clock A signal 48 may pass through a separate OR gate, followed by a NOT gate and subsequently passed to the set and reset pins of the flip-flop. Any suitable combination for generating an error signal at the output of a flip-flop or other suitable storage element to detect when a condition has not been satisfied may be utilized.

The illustrative embodiment of the present invention provides a simple, yet effective means to ensure that necessary conditions for testing an integrated circuit design are satisfied. The illustrative embodiment is relatively inexpensive and easy to implement and does not require complex components. Furthermore, the assertion check may be performed without disrupting or inhibiting the performance of the circuit or the testing of the circuit. The illustrative embodiment significantly improves the reliability of testing and ensures that a circuit design with few faults is designed and manufactured.

The described embodiment is merely illustrative and should not be considered restrictive in any way. Details of the scan design may vary substantially without departing from the spirit of the invention, and exclusive use of all modifications that come within the scope of the appended claims is reserved. It is intended that the invention be limited only to the extent required by the appended claims and the applicable rules of law. The scope of the invention is to be measured by the appended claims, rather than the preceding description, and all variations and equivalents that fall within the range of the claims are intended to be embraced therein.

What is claimed is:

1. A method of performing an assertion check in a scan cell comprising a scanning clock corresponding to a test mode, a system clock corresponding to an operating mode and an enable clock for activating the system clock, said method comprising:

comparing the scanning clock and the enable clock; and generating an error signal if both the scanning clock and the enable clock are high simultaneously.

2. The method of claim 1, wherein the step of comparing the scanning clock and the enable clock comprises passing the scanning clock and the enable clock through a logic gate.

3. The method of claim 2, wherein the scan cell includes a set-reset flip-flop having a set input and a reset input and an output of the logic gate is tied to the set input and the reset input of the flip-flop.

4. The method of claim 3, wherein the set-reset flip-flop generates the error signal at an output pin of the flip-flop if the output of the logic gate is high.

5. The method of claim 2, wherein the logic gate generates an indicator signal indicative of simultaneous activation of the scanning clock and the enable clock.

6. A method of implementing an assertion check in a scan cell comprising a flip-flop connected to a latch, a system clock signal, a scan clock signal and an enable clock signal for activating the system clock signal, said method comprising:

providing a logic gate having inputs and an output; and connecting the enable clock signal and the scan clock signal to the inputs of the logic gate.

7. The method of claim 6, wherein the flip-flop comprises a set-reset flip-flop having a set input and a reset input.

8. The method of claim 7, further comprising the step of connecting the output of the logic gate to the set pin and the reset pin of the flip-flop.

9. The method of claim 8, wherein the flip-flop generates an error signal at an output pin if the enable clock signal and the scan clock signal are both high at the same time.

10. The method of claim 9, further comprising the step of monitoring the output pin to detect the error signal.

11. An integrated circuit having scan capabilities, comprising a master storage element comprising a set-reset flip-flop;

a slave storage element comprising a latch, wherein the master storage element and the slave storage element form a shift register for shifting test data through the integrated circuit to detect faults during a test mode;

a system clock input to the flip-flop for controlling the flip-flop during an operating mode;

a scanning clock input to the flip-flop for controlling the flip-flop during the test mode;

an enable clock input for activating the system clock input; and a logic gate for generating an indicator signal indicative of simultaneous activation of the scanning clock and the enable clock.

12. The integrated circuit of claim 11, wherein the indicator signal is input to a set pin and a reset pin of the flip-flop.

13. The integrated circuit of claim 12, wherein the flip-flop generates an error signal if the indicator signal is high.

14. The integrated circuit of claim 11, wherein the logic gate comprises an AND gate.

15. The integrated circuit of claim 11, wherein the logic gate comprises a NOT gate.

16. The integrated circuit of claim 11, wherein the logic gate comprises a NOR gate.

17. The integrated circuit of claim 11, wherein the logic gate comprises an OR gate.

18. The integrated circuit of claim 11, wherein the enable clock input effects a switch between the operating mode and the test mode.

19. The integrated circuit of claim 11, wherein the test data is generated using an ATPG program.

20. The integrated circuit of claim 11, further comprising a detector for detecting the indicator signal.

* * * * *